United States Patent
Grunzinger, Jr. et al.

(10) Patent No.: US 10,957,128 B2
(45) Date of Patent: Mar. 23, 2021

(54) VEHICLE INSPECTION SYSTEM AND METHOD FOR EVALUATING VEHICLE INSPECTION AND SERVICE INFORMATION

(71) Applicant: Hunter Engineering Company, St. Louis, MO (US)

(72) Inventors: Philip G. Grunzinger, Jr., Valley Park, MO (US); Donald L. Glaser, III, St. Louis, MO (US); Timothy A. Strege, Sunset Hills, MO (US); Nicholas J. Colarelli, III, Frontenac, MO (US)

(73) Assignee: HUNTER ENGINEERING COMPANY, St. Louis, MO (US)

( * ) Notice: Subject to any disclaimer, the term of this patent is extended or adjusted under 35 U.S.C. 154(b) by 321 days.

(21) Appl. No.: 15/947,582

(22) Filed: Apr. 6, 2018

(65) Prior Publication Data
US 2018/0293817 A1 Oct. 11, 2018

Related U.S. Application Data

(60) Provisional application No. 62/482,793, filed on Apr. 7, 2017.

(51) Int. Cl.
| | |
|---|---|
| *G07C 5/00* | (2006.01) |
| *G07C 5/08* | (2006.01) |
| *G06T 7/00* | (2017.01) |
| *G07C 5/12* | (2006.01) |
| *G06F 3/0481* | (2013.01) |
| *G01M 17/00* | (2006.01) |

(Continued)

(52) U.S. Cl.
CPC ........... *G07C 5/0808* (2013.01); *G01M 13/00* (2013.01); *G01M 17/00* (2013.01); *G06F 3/04817* (2013.01); *G06T 7/0004* (2013.01); *G07C 5/008* (2013.01); *G07C 5/12* (2013.01); *G06Q 10/20* (2013.01)

(58) Field of Classification Search
CPC ................................ G07C 5/08; G06F 3/0481
See application file for complete search history.

(56) References Cited

U.S. PATENT DOCUMENTS

| | | | |
|---|---|---|---|
| 6,263,322 B1 | 7/2001 | Kirkevold et al. | |
| 2008/0040125 A1* | 2/2008 | Okabe | G06Q 30/018 |
| | | | 705/317 |

(Continued)

OTHER PUBLICATIONS

Hunter Engineering Company, HunterNet—Your Online Database for Vehicle Information and Shop Statistics, Hunter Engineering Company Product Brochure Form No. 6508-T, Jul. 2016, 8 pages.

*Primary Examiner* — Kira Nguyen
(74) *Attorney, Agent, or Firm* — Sandberg Phoenix & von Gontard, P.C.

(57) ABSTRACT

A vehicle inspection system for acquiring measurements of at least one vehicle moving through an inspection lane is in communication with a remote data processing and storage system to aggregate data from multiple vehicles passing through the inspection lane, and optionally, from multiple inspection lanes. The remote data processing and storage system is configured with suitable software instructions to store the received vehicle inspection data, as well as vehicle service data received from vehicle service equipment, and to generate reports and/or respond to data queries using the stored vehicle inspection and vehicle service data.

11 Claims, 7 Drawing Sheets

(51) Int. Cl.
*G01M 13/00* (2019.01)
*G06Q 10/00* (2012.01)

(56) References Cited

U.S. PATENT DOCUMENTS

| | | | |
|---|---|---|---|
| 2013/0158777 A1* | 6/2013 | Brauer | G06Q 10/20 |
| | | | 701/31.4 |
| 2014/0253908 A1 | 9/2014 | Lee | |
| 2015/0059458 A1 | 3/2015 | Lee | |
| 2016/0282228 A1 | 9/2016 | Lee | |
| 2017/0116792 A1* | 4/2017 | Jelinek | G07C 5/12 |

* cited by examiner

VEHICLE INSPECTION SYSTEM AND METHOD FOR EVALUATING VEHICLE INSPECTION AND SERVICE INFORMATION

CROSS-REFERENCE TO RELATED APPLICATIONS

The present application is related to, and claims priority from, U.S. Provisional Patent Application Ser. No. 62/482,793 filed on Apr. 7, 2017, which is herein incorporated by reference.

STATEMENT REGARDING FEDERALLY SPONSORED RESEARCH

Not Applicable.

BACKGROUND OF THE INVENTION

The present application is related to vehicle measurement or inspection systems and, in particular, to a vehicle inspection or measurement system configured with multiple sensor modules to acquire data associated with a vehicle passing through a vehicle inspection lane, and to communicate the acquired data to a centralized processing system configured for data processing, data storage, and data reporting functionality, as well as communication with other elements present within a vehicle service operation.

Systems for measuring or inspecting vehicle properties, such as wheel alignment, tire tread depth, tire pressure, and associated parameters, are traditionally set up for obtaining measurements to a high degree of accuracy under controlled conditions, with the vehicle disposed in a stationary location on a level surface or alignment lift rack. These vehicle measurement or inspection systems may require the temporary placement of various inclinometers or optical targets on the vehicle wheels, or the use of specialized sensors, from which data is acquired to determine the various measurements. In general, vehicle measurement or inspection procedures often require a technician to spend time preparing the vehicle for measurements, acquiring the measurements, and optionally performing adjustments necessary to correct any identified problems.

In order for the technician to complete these tasks, the vehicle must be stationary for part of the time, such as for the attachment (and subsequent removal) of optical targets or angle sensors to the vehicle wheels. This necessitates establishing a routine or procedure which must be followed by a technician each time a vehicle is brought into the shop for service. During busy times, or when multiple customers are waiting, a technician may not have sufficient time to carry out these routines or procedures for every vehicle, potentially failing to identify vehicles in need of additional services.

In response to the recognized need for a way to quickly identify vehicles which may require a service, various vehicle measurement and inspection systems have been developed to identify, inspect, and measure parameters of a moving vehicle passing through an inspection lane. These systems include optical imaging systems configured to identify a vehicle license plate for retrieval of vehicle identifying information, such as license plate characters, drive-over tire tread depth measurement sensors for measuring tire tread wear on the vehicle wheels, drive-over tire pressure sensors for determining an inflation pressure of the vehicle tires, contactless measurement systems for determining alignment characteristics of the moving vehicle's wheels, and optical recording systems for acquiring a set of images representative of the condition of the vehicle exterior surfaces as it moves through the inspection lane.

Operating independently, each of these various vehicle measurement and inspection systems provides useful information to a vehicle service provider. However, due to their independent nature, it becomes difficult for a service provider, vehicle technician, or vehicle owner to fully utilize all of the available information acquired for an individual vehicle passing through an inspection lane, both at the time of the vehicle inspection, and at subsequent points in time.

Accordingly, it would be beneficial to the vehicle service and inspection industry to amalgamate vehicle related data acquired from a variety of sensor modules associated with a vehicle inspection lane both at a local processing system and at a remote processing system so as to enable the data to be efficiently utilized at the time of the vehicle inspection and at a subsequent point in time independent from the specific sensor modules and vehicle inspection lane in which the data was acquired.

BRIEF SUMMARY OF THE INVENTION

Briefly stated, the present application sets forth a system for vehicle inspection and reporting. The system includes data acquisition components to acquire vehicle service or inspection data, processing components to process the acquired data either locally or remotely, data storage components to store the data in association with the local processing system and/or the remote processing system, and display systems configured to display processed data or reports based on the acquired data responsive to the local and/or remote processing systems.

In one embodiment, the present application sets forth a vehicle inspection system for acquiring measurements of at least one vehicle moving through an inspection lane. The vehicle inspection system includes a non-contact measurement system having at least one sensor system disposed on each lateral side of said inspection lane, each of which is configured with an associated field of view into the inspection lane to acquire measurements associated with a moving vehicle passing through the inspection lane. A processing system is coupled for communication with the non-contact measurement system and is configured with software instructions to receive and evaluate vehicle measurements to determine at least one characteristic of the moving vehicle. At least one additional measurement system such as a drive-over tire tread depth measurement system, a drive-over tire pressure measurement system, a license plate recognition system, and/or a vehicle body condition image capture system is configured to acquire and communicate vehicle data to the processing system.

In a further embodiment of the vehicle inspection system, an imaging system is coupled to the processing system. The imaging system includes at least one imager module on each lateral side of said inspection lane, each of which is configured to acquire a plurality of images of exterior surfaces on the moving vehicle for communication to the processing system to include in an image set associated with the moving vehicle. The processing system is further configured to extract license plate character data from at least one image in the image set, and optionally, to apply a perspective correction to the at least one image before extracting the license plate character data.

In yet another embodiment, a vehicle inspection system for acquiring measurements of at least one vehicle moving through an inspection lane is in communication with a remote data processing and storage system to aggregate data from multiple vehicles, and optionally, from multiple inspection lanes. The remote data processing and storage system is configured with suitable software instructions to store the received vehicle inspection data, as well as vehicle service data received from vehicle service equipment, to generate reports and/or respond to data queries using the stored vehicle inspection and vehicle service data.

The foregoing features, and advantages set forth in the present disclosure, as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings. It is to be understood that the drawings are for illustrating the concepts set forth in the present disclosure and are not to scale.

Figure 1:
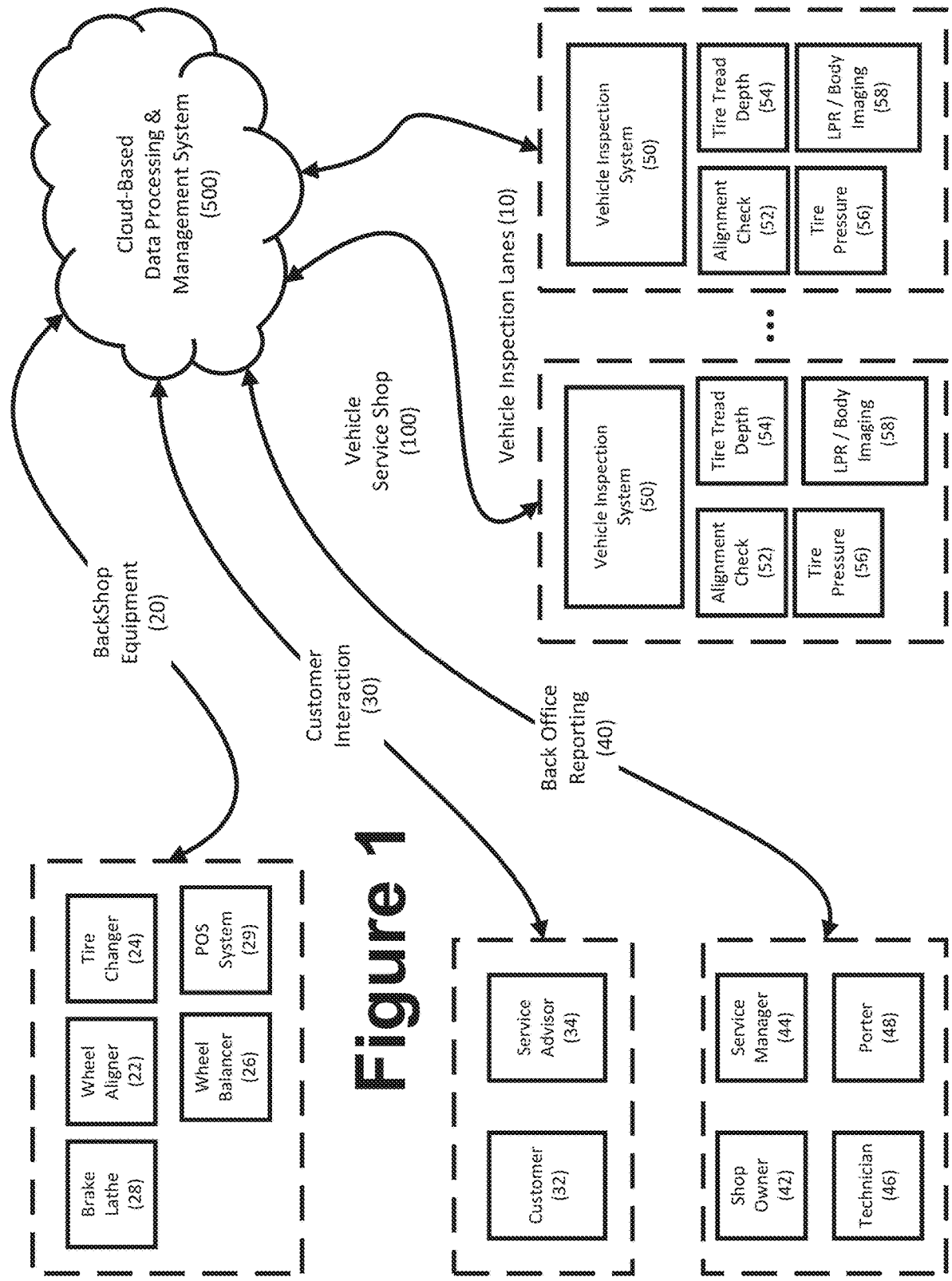
FIG. 1 is an overview of the system architecture associated with a distributed vehicle service system of the present application.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

The term "axle", as used herein, is intended to refer to a pair of vehicle wheel assemblies, each consisting of a wheel rim and a tire, disposed on opposite lateral sides of the vehicle, and which are generally axially aligned with respect to each other, such as the left and right front wheels or the left and right rear wheels. The pair of vehicle wheel assemblies may be, but is not limited to wheel assemblies coupled by a solid interconnecting axle shaft, by a pair of half-shafts coupled through a differential, those which are partially independent of each other, or those which are fully independent of each other.

Since the present application describes features which exist on opposite lateral sides of a vehicle inspection lane through which a moving vehicle V passes, but which are otherwise identical, it will be understood that the use of the reference designations Left and Right, or L and R as in the Figures, identify corresponding components utilized at locations relative the left and right lateral sides of a vehicle or vehicle inspection lane. For example, a sensor module described generically as n will be designated as nR and nL when specifically shown or described at either the right or left side of the vehicle inspection lane 10.

Turning to the Figures, and to FIG. 1 in particular, an overview of the system architecture for a distributed vehicle service system of the present application is shown generally. The system consists of distinct groups of related elements. For example, the system architecture may encompass vehicle inspection lanes 10, back shop equipment 20, customer interaction elements 30, and back office reporting elements 40, all of which are operatively linked via a cloud-based data processing and management system 500 such as HunterNet® developed by Hunter Engineering Company of St. Louis, Mo. The various groups of elements are not limited in number or geographic location, and may in fact, be repeated multiple times across multiple vehicle service shops 100. A vehicle service operation may include multiple vehicle service shops located in geographically separate locations, each of which includes multiple vehicle inspection lanes 10 for receiving vehicles, associated customers 32, service advisors 34, and multiple pieces of back shop vehicle service equipment 20 for servicing vehicles (i.e., wheel alignment systems 22, tire changers 24, wheel balancers 26, and/or brake lathe 28) or for completing transactions involving the sale of vehicle components such as tires or batteries (i.e., point of sale systems 29). Multiple entities may be involved in the back office reporting (40), both at the level of individual service shops and through-out a corporate hierarchy, including an owner of the vehicle service operation 42, service managers 44 responsible for the individual vehicle service shops, as well as numerous vehicle service technicians 46, and vehicle porters 48.

A vehicle service shop 100 includes at least one vehicle inspection lane 10 for acquiring data associated with individual vehicles V entering the vehicle service shop. Each inspection lane includes a vehicle inspection system 50, which may consist of a vehicle alignment check system 52, a tire tread depth measurement system 54, a tire pressure measurement system 56, and an imaging system 58 for acquiring license plate data or vehicle body condition records. Acquired vehicle data is initially processed within a vehicle inspection system 50 associated with the vehicle inspection lane 10, and the processed results, or the original data, is subsequently communicated to the cloud-based data processing and management system 500. From the cloud-based data processing and management system 500, vehicle identifying information and acquired measurements are stored, processed and/or made available to customer interaction elements 30, back office reporting elements 40, and/or other vehicle inspection lane components 50 in the vehicle service shop 100, in the form of customer greetings, lane activity displays, vehicle service reports, vehicle service opportunity reports, and/or equipment usage reports.

Figure 2:
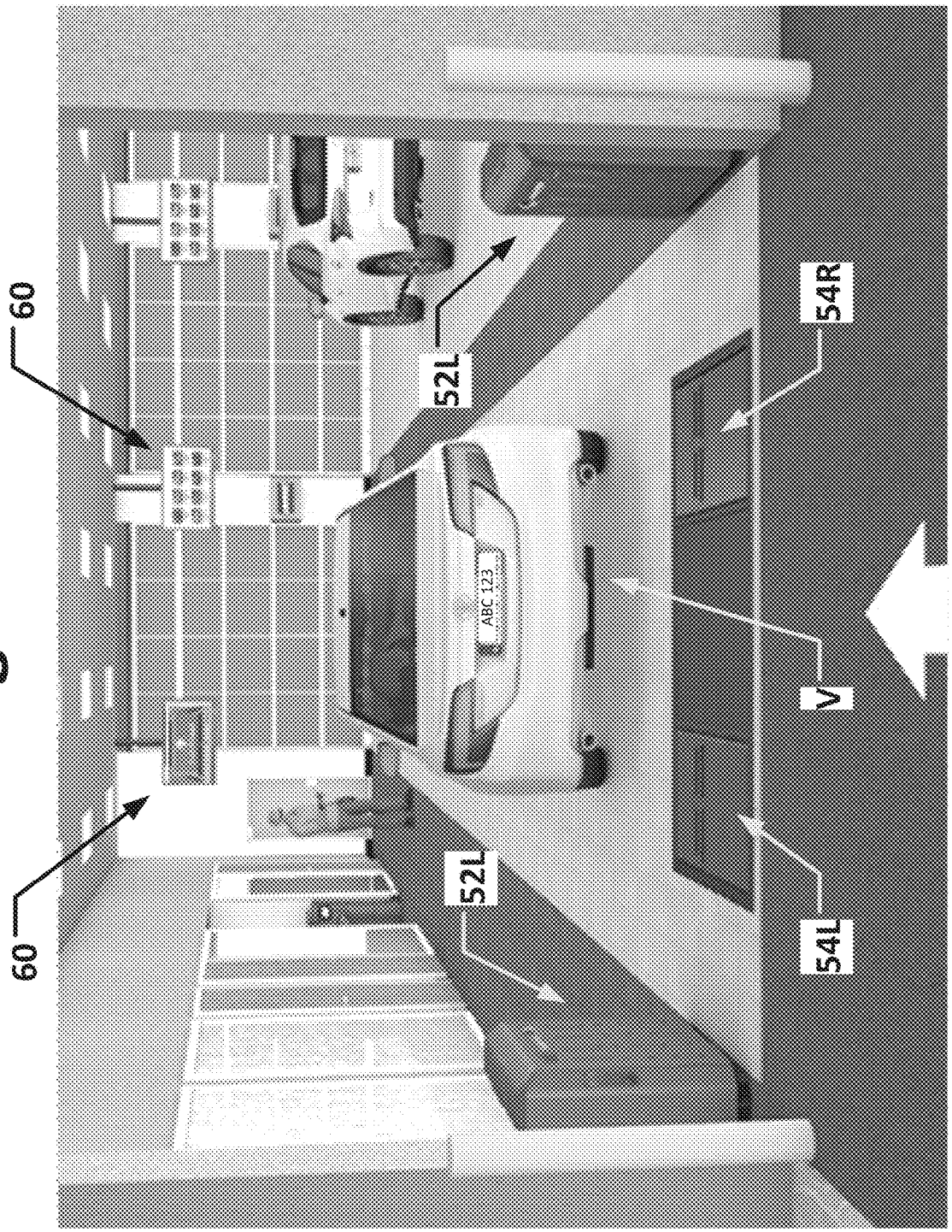
FIG. 2 is a perspective view of a vehicle inspection lane with a variety of vehicle inspection sensor modules and associated display devices.

In general, as seen in FIG. 2, a vehicle V entering a vehicle inspection lane 10 passes various sensor systems of a vehicle inspection system 50 in order to generate an initial diagnostic overview of the vehicle V with minimal operator interaction. The sensor systems may include an alignment check system 52 employing sensors modules 52L and 52R on opposite lateral sides of the vehicle inspection lane 10 for acquiring a plurality of distance measurements related to vehicle wheel alignment, tire tread depth sensors 54L and 54R for measuring tire tread wear conditions on each wheel of the vehicle axles, and tire pressure measurement sensors (not shown) for measuring an inflation condition of each tire.

Figure 3:
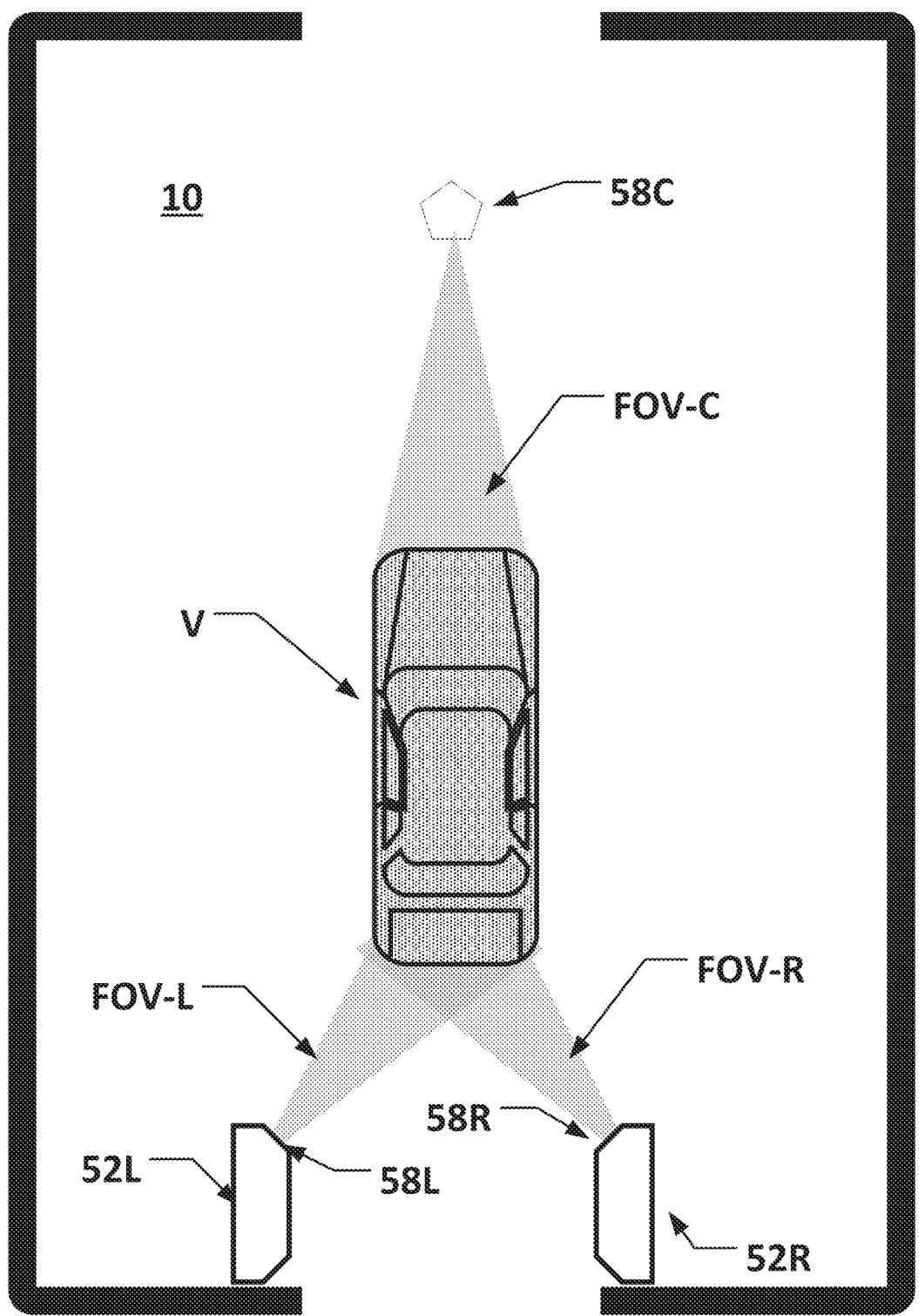
FIG. 3 illustrates exemplary fields of view for imaging sensors capturing images of a vehicle moving through an inspection lane.

As seen in FIG. 3, imaging system sensors 58L, 58R, and/or 58C may be provided with associated fields of view FOV-L, FOV-R, or FOV-C, suitable for capturing images of the vehicle body. Captured images of the vehicle body establish a record of the vehicle condition, including visible damage, and/or record vehicle identifying information such as license plate data for evaluation by optical character recognition technology to assist in recalling associated vehicle identification number (VIN) data or customer data.

Depending upon the configuration of the various sensor systems 52, 54, 56, and 58 acquiring data associated with the vehicle V as it moves through the vehicle inspection lane 10, the vehicle inspection system 50 may be set up to generate a detailed report on the condition of multiple components of the vehicle V, such as alignment conditions, tire wear conditions, tire pressure measurements, recalled vehicle and customer records, and recommended services and/or replacement parts such as suitably sized replacement tires, without the need for an operator to manually identify, record, or retrieve vehicle-specific data. The generated report may be provided in a locally printed document, displayed on a local display device 60 such as a large-screen monitor, or communicated by wired or wireless communications link to the cloud-based data processing and management system 500 for subsequent storage and/or delivery to various end users, such as to a customer 32 or service advisor 34 via a mobile device.

Figure 5:
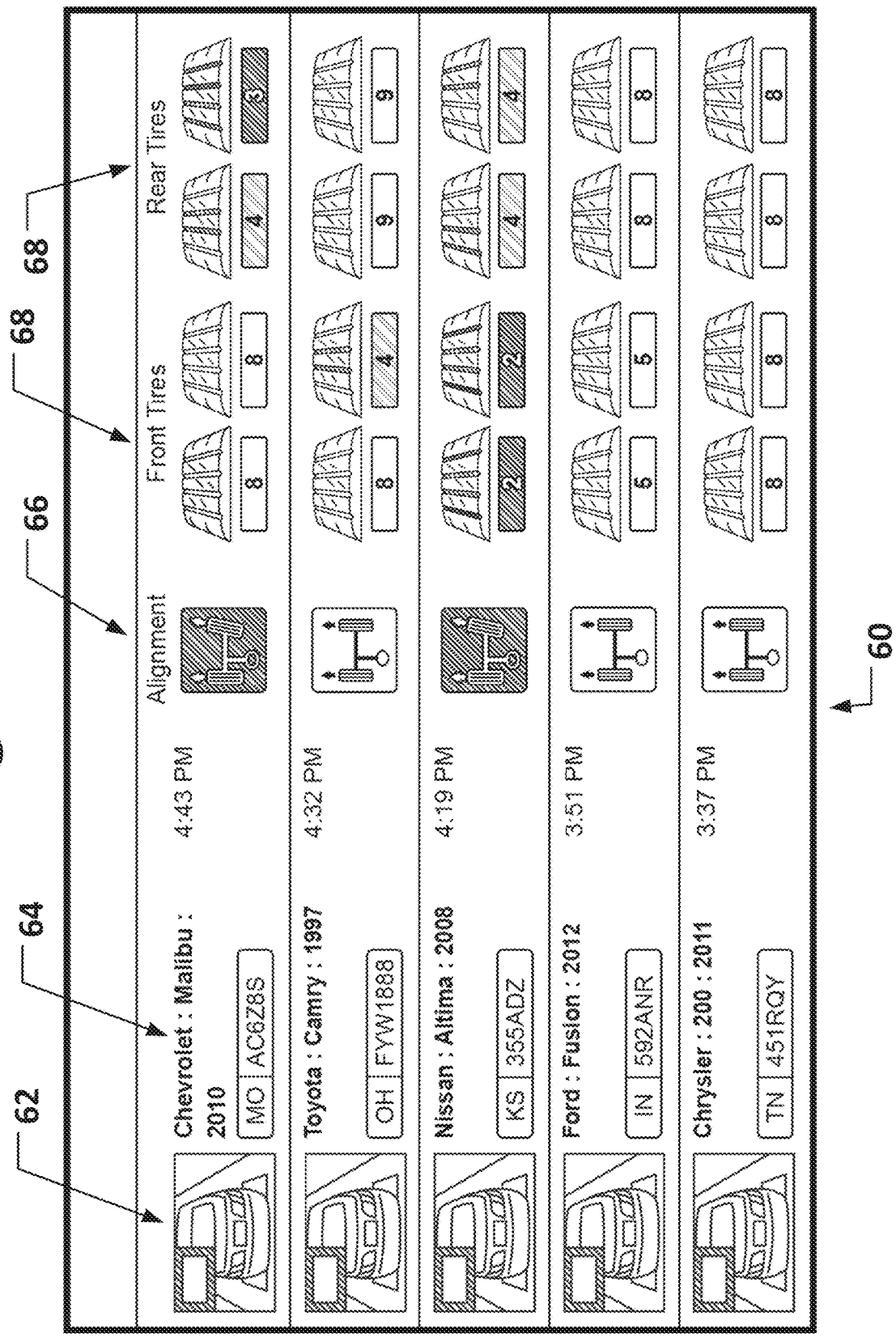
FIG. 5 is a representation of a lane activity display associated with a vehicle inspection lane.

In one embodiment, following an entry of a vehicle V into the vehicle inspection lane 10, the vehicle inspection system 50 generates a simplified greeting, vehicle inspection summary or inspection lane report in a lane activity display on device 60 in proximity to the vehicle inspection lane 10 or a customer greeting area in the vehicle service shop 100. As a simplified greeting, the lane activity presented on the device 60 may be as minimal as an image of a single vehicle V and time of entry into the inspection lane 10, or as shown in FIG. 5, may be expanded to include a vehicle image 62, determined vehicle-identifying information 64 such as license plate information and/or recalled VIN information such as make, model and year, an associated customer name retrieved from a lookup database of pre-existing customer records, and any inspection lane results for the vehicle, such as a representation 66 of wheel alignment condition, and individual tire tread depth representations 68.

When presenting inspection lane reports as a lane activity display on the device 60, data from vehicles V entering the vehicle inspection lane 10 can be presented in a logical order, typically with the most recent vehicle presented in a top position, and previous vehicles displayed in stacked or scrolling order on the display. As shown in FIG. 5, an exemplary lane activity display on a device 60 is organized to present inspection lane reports for five different vehicles in a downward scrolling arrangement, with the most recent chronological entry forming the top row of the display, and the oldest entry at the bottom row. When a sixth vehicle V enters the vehicle inspection lane 10, the oldest entry is removed from the display, and existing entries scrolled downward to permit display of the next vehicle V in the uppermost row.

It will be understood that the vehicle-specific information displayed on the lane activity display device 60, as well as the number of vehicles concurrently included in the displayed information, may be selected and customized by the vehicle service shop 100 to provide only information which is deemed relevant to the intended observers, such as service technicians 46, service advisors 34, or customers 32.

Alternatively, for arrangements in which vehicle inspection systems 50 are associated with multiple inspection lanes 10 in one or more vehicle service shops 100, vehicle information from each vehicle inspection system 50 is initially communicated to the cloud-based data processing and management system 500, wherein the simplified greetings (for customers 32), summary reports (for customers 32, service technicians 46 or service advisors 34), or inspection lane activity reports (for service technicians 46 or service advisors 34) are generated and communicated back to one or more local display devices 60 for presentation.

The software architecture for use with each vehicle inspection system 50 is configured to interact with both local and remote resources. Local resources may include, but are not limited to, the various sensor systems 52, 54, 56, and 58 within each vehicle inspection lane 10 which generate data or input to the vehicle inspection system 50 and accompanying temporary and permanent data storage devices. Remote resources, accessible via a suitable wired or wireless communication link, such as the Internet, include, but are not limited to, the cloud-based data processing and management system 500. For example, in conjunction with generating a report or greeting, or as an alternative, the data acquired as a vehicle V moves through the inspection lane 10 may be communicated by the vehicle inspection system 50 to the cloud-based data processing and management system 500 for long-term storage and/or remote processing of the vehicle inspection data.

Figure 4:
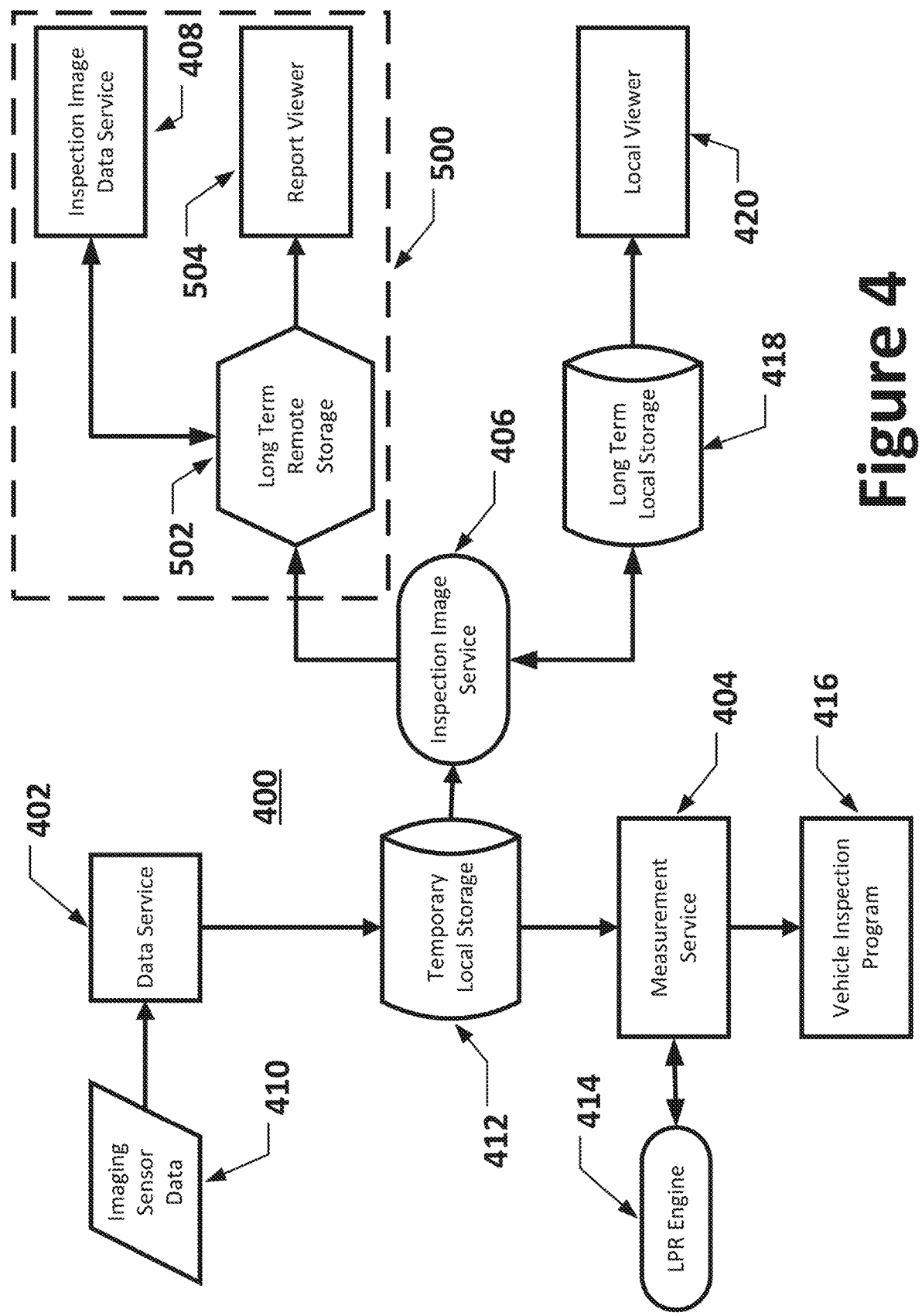
FIG. 4 is an exemplary software architecture for a vehicle image capture and license plate recognition vehicle inspection sensor module and a cloud-based records management system.

FIG. 4 illustrates an exemplary configuration of the software architecture for use with imaging sensors 58(L,R,C) associated with a vehicle inspection system 50 in order to capture and record vehicle body condition and/or vehicle identifying image data. It will be understood that with suitable modifications, similar software architecture may be utilized for other sensors 52, 54, and 56 associated with the vehicle inspection system 50. The software architecture is divided into distinct services, consisting of a data service 402, a measurement service 404, an inspection image service 406, and a cloud-based inspection image data service 408. The data service 402 receives initial image data 410 from the imaging sensors 58 and conveys it to a temporary or short-term local storage 412, such an electronic memory structure. If the images are to be processed further to extract vehicle identifying information, the measurement service 404 accesses the temporary or short-term local storage 412 to retrieve the image data for processing. The processing may involve various techniques, such as perspective correction or masking to extract data representative of the vehicle license plate, which is then conveyed in appropriate form to a license plate recognition engine 414 for further evaluation and optical character recognition. License plate data returned from the license plate recognition engine 414 to the measurement service 404 is passed to the vehicle inspection system software 416 for subsequent use in a data lookup procedure, retrieving vehicle identifying data such as a VIN or customer name associated with the returned license plate data. Image data stored in the temporary or short-term local storage 412 is further accessed by the inspection image service 406 for allocation to either long term local storage 418 (such as on a hard drive) from which the images may be recalled as needed for viewing using a local image viewing program 420, or for communication to the cloud-based data processing and management system 500 and a long term remote storage system 502.

Images communicated to the cloud-based data processing and management system 500 can be evaluated at a subsequent point in time by the cloud-based inspection image data service 408 for various purposes, such as for inclusion in a vehicle inspection report, an inspection lane summary, or recalled for review of vehicle body condition. The cloud-based data processing and management system 500 may receive data from inspection image services 406 associated with multiple vehicle inspection systems 50, located in multiple vehicle inspection lanes 10 at a single vehicle service facility, or located at separate geographic locations such as related branches of a vehicle service group or dealership. The collected data may be sorted or filtered to view only information associated with a single inspection lane 10, a single vehicle service facility, or an aggregate of multiple inspection lanes and/or vehicle service facilities.

The images in the cloud-based data processing and management system 500 may be accessed (for example, by a viewer software program 504) for selective recall and viewing, or for communication to various display devices 60, such as a lane activity display (FIG. 5) in proximity to the vehicle inspection lane 10, or a mobile device associated with a customer 32 or service advisor 34.

As seen in FIG. 1, back shop vehicle service equipment 20 for servicing vehicles may include any number of traditional or conventional vehicle service devices such as, but not limited to wheel alignment systems 22, tire changing systems 24, wheel balancers 26, or brake lathes 28. Systems for completing transactions involving the sale of vehicle components such as tires or batteries (i.e., point of sale systems 29) are considered as back shop vehicle service equipment for the purpose of the present application.

Within the distributed vehicle service system of the present application, the back shop vehicle service equipment 20 generally includes systems which are configured with suitable hardware and software instructions to communicate with, and report to, the cloud-based data processing and management system 500 when various vehicle service procedures (or selected vehicle component sales) take place, providing a record of the vehicle services performed (or selected vehicle components sold). Preferably the information reported by the back shop vehicle service equipment 20 is associated with vehicle identifying information, permitting the cloud-based data processing and management system 500, when configured with suitable software programs, applications, or instructions, to correlate reported vehicle services with vehicle inspection results received from the vehicle inspection lanes 10, as well as with previously stored information associated with the same vehicle V.

As seen in FIG. 1, customer interaction elements 30 of the present application include electronic devices associated with individuals, such as customers 32 and the service advisor employees 34 of the vehicle service shop 100. These electronic devices may include, but are not limited to, various display and/or suitably configured communication devices such as waiting-area displays, desktop computers or tablet devices for use by the service advisors when discussing vehicle service options with the customer, and mobile devices such as laptops or cell-phones configured with software instructions, programs, or applications to receive e-mail correspondence and display vehicle inspection or service results. Within the system architecture of the vehicle service and inspection system, customer interaction elements are electronic devices which are capable of receiving vehicle service data, such as inspection reports, from the cloud-based data processing and management system 500. The vehicle service data may be communicated from the cloud-based data processing and management system 500 via e-mail communications, or may be pushed to electronic device software programs or applications configured to receive and display vehicle service data, such as on a lane activity display 60 present in a customer waiting area or a tablet device for use by a service advisor 34 to view specific inspection or service data associated with a vehicle V.

Figure 6:
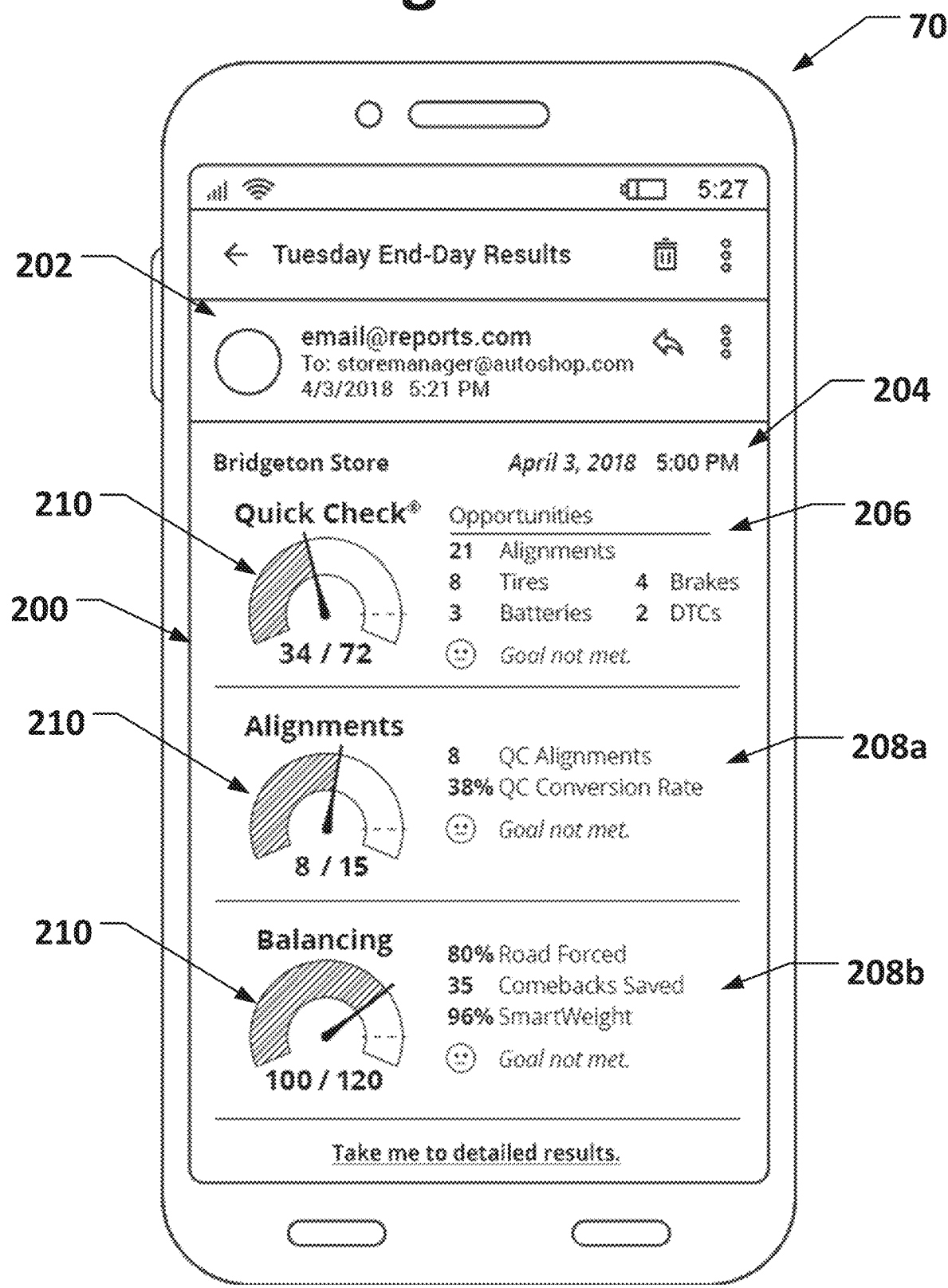
FIG. 6 illustrates an exemplary individual vehicle service shop goal-oriented progress report displayed on a mobile device.

Multiple entities may be involved in back office reporting 40 as seen in FIG. 1, both at the level of individual service shops and through-out a corporate hierarchy, including an owner of the vehicle service operation 42, service managers 44 responsible for the individual vehicle service shops 100, as well as numerous vehicle service technicians 46 and porters 48. Back office reporting elements of the present application include suitably configured electronic devices associated with these entities, such as, but are not limited to, various display and/or communication devices including service area displays, desktop computers, tablet devices, laptops, and cell-phones. Within the system architecture of the distributed vehicle service system, back office reporting elements 40 are electronic devices configured with suitable software programs, applications or instructions to both receive vehicle service data, such as inspection reports, from the cloud-based data processing and management system 500, and to query or access the cloud-based data processing a management system 500 to recall service data associated with one or more vehicles V. For example, a vehicle service operation owner 42 may utilize a back office reporting element, such as a suitable configured desktop computer or mobile device, to access vehicle service records associated with vehicle service procedures performed in selected vehicle service shops 100 during a specific period of time in order to generate productivity reports, such as shown in FIG. 6. An exemplary productivity report 200, as shown in FIG. 6 on a mobile device 70, may include, but is not limited to, contact information 202, time/date information 204, vehicle inspection summary data 206, and vehicle service data 208a, 208b. Vehicle summary data and vehicle service data can be configured to present information regarding the specific opportunities for vehicle service noted during inspections, as well as a corresponding number of vehicle service procedures (such as wheel alignment and tire balancing) actually conducted. The information may be presented both numerically and visually, in the form of bar graphs or gauges 210, enabling the viewer to determine if a vehicle service shop 100 is operating efficiently or is meeting established performance goals.

Linking all of the various components of the distributed vehicle service system of the present application is the cloud-based data processing and management system 500, such as the HunterNet® system developed by Hunter Engineering Company of St. Louis, Mo. The cloud-based data processing and management system receives vehicle inspection data from multiple vehicle inspection lanes 10, as well as vehicle service data from multiple pieces of back shop equipment 20. All of the vehicle inspection and vehicle service data received at the cloud-based data processing and management system 500 is associated with a user account. At one extreme, a user account may be associated with a single vehicle inspection lane 10 or vehicle service system 20, while at the other extreme, a user account may be associated with multiple vehicle inspection lanes and vehicle service systems distributed across multiple vehicle service shops 100 under common ownership.

The cloud-based data processing and management system 500 may be configured with suitable software programs, applications, or instructions to evaluate vehicle inspection data received from vehicle inspection lanes 10 associated with a user account in order to identify vehicle service opportunities, organize the vehicle inspection data into logical long-term storage arrangements, and to generate reports based on the vehicle inspection data. Reports are generated either upon request from back office reporting elements 40, or automatically in response to receipt of the vehicle inspection data for communication to display devices 60, customer interaction elements 30, or back office reporting elements 40.

The cloud-based data processing and management system 500 may be configured with suitable software programs, applications, or instructions to evaluate vehicle service data received from back shop vehicle service equipment 20 associated with a user account in order to identify completed vehicle services, to place vehicle service data into long-term storage 502, and to generate reports based on the vehicle service data either upon request (such as from back office reporting components 40) or automatically for subsequent retrieval or for pushing to display or communications devices 60 associated with customer interaction or back office reporting.

In an exemplary configuration, the cloud-based data processing and management system 500 is configured with suitable software programs, applications or instructions to correlate vehicle service and vehicle inspection data associated with a selected user account to provide a quantitative analysis 206, 208 of vehicle service opportunities over a selected period of time, such as shown in FIG. 6. The quantitative analysis identifies at least one of: (i) a number of said vehicle service opportunities missed; (ii) a number of vehicle service opportunities completed; (iii) an efficiency representation expressed as a percentage of identified vehicles requiring vehicle service; or (iv) a progress representation expressed as a relationship between vehicle service opportunities (identified or completed) and a target value or goal. Vehicle service opportunities missed (or completed) are identified by the cloud-based data processing and management system 500 by comparing received or stored vehicle inspection data against received or stored vehicle service data for the selected period of time. Expressing the number of vehicle service opportunities missed (or completed) against the total number of vehicle service opportunities (i.e., vehicle requiring service) identified in the vehicle inspection data for a selected period of time yields an efficiency representation.

Alternatively, the cloud-based data processing and management system 500 can be configured with suitable software programs, applications, or instructions to compare the number of vehicle service opportunities identified (or completed) within a selected period of time against target totals set for the user account to determine a representation of progress towards a goal. As seen in FIG. 6, an exemplary report 200 generated by the cloud-based data processing and management system 500 for display on a back-office device or communication to an authorized user presents progress information in a graphical and numerical formats for easy comprehension. The cloud-based data processing and management system 500 can be further configured to automatically generate and communicate alerts to suitable back office personnel, such as service managers 44 and vehicle shop owners 42, if progress towards a set goal is insufficient to meet the set goal within a selected period of time, thereby enabling the service manager 44 or shop owner 42 to take timely corrective action. Similarly, by identifying and comparing multiple records of vehicle inspection or service data received and stored associated with a single vehicle V, the cloud-based data processing and management system 500 can identify vehicle condition trends, such as worsening wheel alignment conditions or tire tread wear, for which an alert can be generated and communicated to either a service advisor or a vehicle. A condensed report 300 consolidating similar information from multiple vehicle service shops 100 within an automotive service group or under common ownership can be generated as well, enabling an owner 42 to identify underperforming locations.

Figure 7:
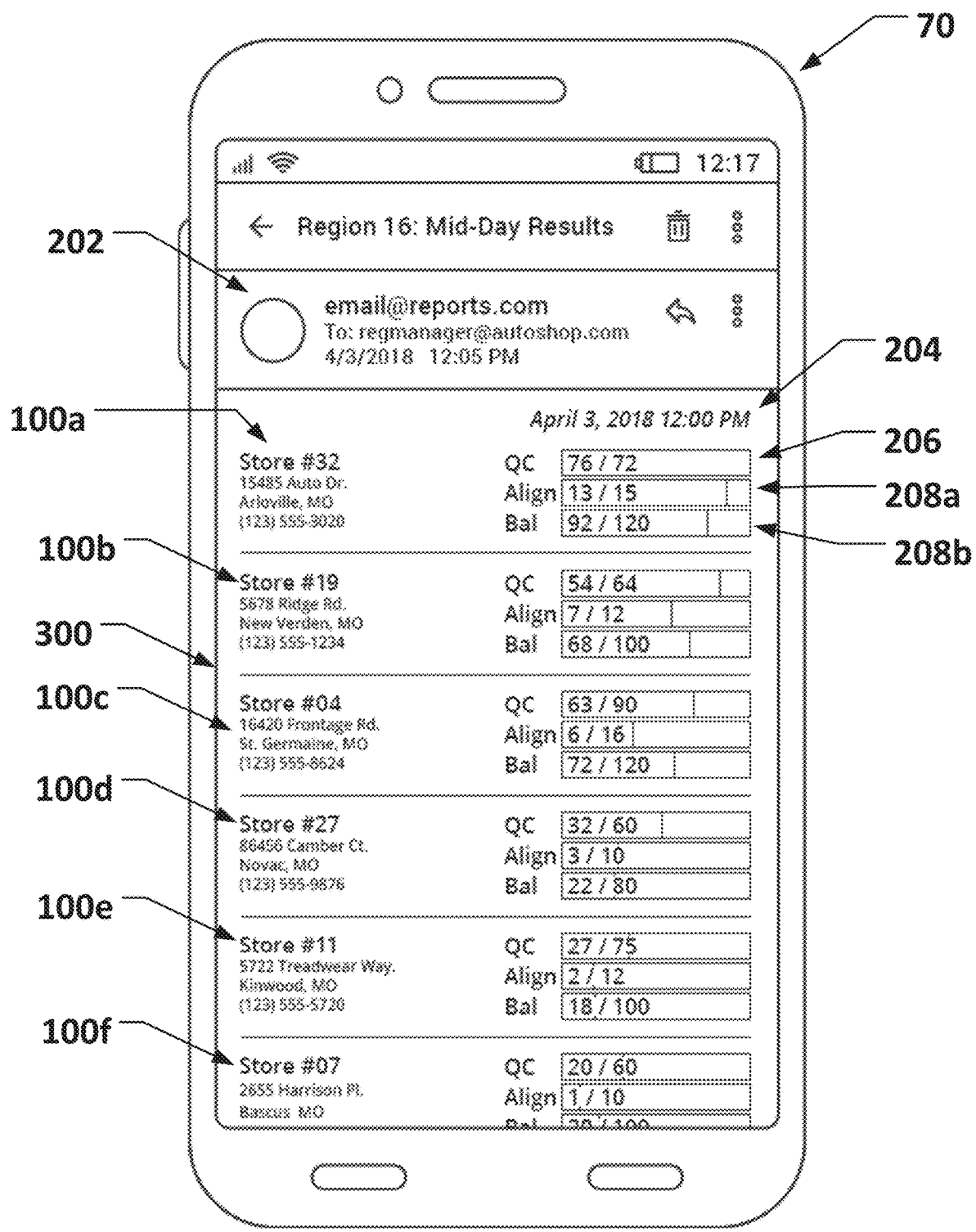
FIG. 7 illustrates an exemplary vehicle service group goal-oriented progress report displayed on a mobile device.

In an exemplary configuration, the cloud-based data processing and management system 500 is configured with software instructions to review vehicle inspection data associated with a selected user account, producing reports 300 such as shown in FIG. 7 identifying a total number of vehicle wheel alignment opportunities received at a selected vehicle service shop 100 (or at multiple associated vehicle service shops 100a-n) for a given day. By further identifying with the cloud-based data processing and management system 500 the number of vehicle wheel alignment services completed at that vehicle service shop 100 (or shops 100a-n) on the same day from associated vehicle service data, one or more of the metrics (i)-(iv) noted above can be identified for that vehicle service shop 100 (or vehicle service shops 100a-n). The resulting reports 300 can be conveyed to the back office reporting elements, such as the user account owner 42 or service manager(s) 44, etc. If vehicle identifying data is available for both the vehicle inspection data and the vehicle service data, vehicles V for which the alignment services were not completed can be identified, and the information used to generate follow-up advertising or contact lists for use by service advisors 34 or marketing employees.

In a further exemplary configuration, the cloud-based data processing and management system 500 is configured to review vehicle inspection data associated with a selected user account to identify specific services, such as a total number of tire replacement opportunities received at one or more selected vehicle service shops 100 for a given day. By identifying with the cloud-based data processing and management system 500 the number of tires sold or tire changing operations completed at the vehicle service shop(s) 100 on the same day from associated vehicle service data (or point of sale data), one or more of the metrics (i)-(iv) noted above can be identified for the vehicle service shop(s) 100. The resulting reports can be conveyed to the back office reporting elements, such as a shop owner 42 or service manager(s) 44, etc. If vehicle identifying data is available for both the vehicle inspection data and the vehicle service data, vehicles V for which tire replacement services were not completed can be identified and the information used to generate follow-up advertising or contact lists for use by service advisors 34 or marketing employees.

The cloud-based data processing and management system 500 may be further configured to receive queries or requests from back office reporting systems 40 or electronic devices, requesting specific reports associated with vehicle service data, vehicle inspection data, and/or quantitative analysis of stored data for an associated user account. Exemplary user-account reports generated by the cloud-based data processing and management system 500, with suitable software instructions, may include productivity reports for specific vehicle service shops 100, usage of back shop vehicle service equipment 20, progress towards selected goals of vehicle services, success rates for converting identified vehicle service opportunities into completed vehicle services, etc. Different entities within the back office reporting group 40 associated with the associated user account may request or require access to different types of reports from the cloud-based data processing and management system 500. For example, service managers 44 may be concerned only with the operation of a single vehicle service shop 100 or particular vehicle service department within a vehicle service shop, while a shop owner 42 may be focused on the operation of multiple vehicle service shops 100*a-n* within an organization. The cloud-based data processing and management system 500 is preferably configured with suitable software instructions and programs to enable the authorized users to receive reports appropriate for their level of authorization, and to exclude them from reporting services for which they lack authorization, enabling a shop owner 42 to establish a hierarchical reporting system for a given user account within the cloud-based data processing and management system 500.

It will be recognized that the cloud-based data processing and management system 500 provides sufficient functionality, via suitable software programs, applications or instructions, to enable the establishment of automatic reporting functions based on received or stored vehicle service and/or vehicle inspection data. For example, rather than require productivity and usage reports 200, 300 to be requested by entities associated with the back office reporting group 40 of a user account, the cloud-based data processing and management system 500 may be set up to automatically run selected reports 200, 300 for the user account on a periodic basis, and push or delivery the results to desired recipients, such as via e-mail communication or placement in a shared dataspace for subsequent retrieval by an authorized end user.

While the present disclosure has described a vehicle measurement or inspection system in which an output is conveyed to an operator through a suitably configured operator console or display device, it will be understood that output may optionally be provided in the form of a printed report, stored in a machine-readable database, or communicated over a network to a remote vehicle service system or software application. The processing system of the vehicle inspection system of the present disclosure may be in the form of a dedicated computer system associated with a specific set of sensors forming the vehicle inspection system, or may be in the form of a server system configured to communicate with a variety of sensors, such as those forming two or more independent vehicle inspection systems. Communications between the various sensors and the processing system may be via any conventional data transmission means, such as wired networks, wireless networks, or any combination thereof.

The present disclosure can be embodied in-part in the form of computer-implemented processes and apparatuses for practicing those processes. The present disclosure can also be embodied in-part in the form of computer program code containing instructions embodied in tangible media, or another computer readable non-transitory storage medium, wherein, when the computer program code is loaded into, and executed by, an electronic device such as a computer, micro-processor or logic circuit, the device becomes an apparatus for practicing the present disclosure.

The present disclosure can also be embodied in-part in the form of computer program code, for example, whether stored in a non-transitory storage medium, loaded into and/or executed by a computer, or transmitted over some transmission medium, wherein, when the computer program code is loaded into and executed by a computer, the computer becomes an apparatus for practicing the present disclosure. When implemented in a general-purpose microprocessor, the computer program code segments configure the microprocessor to create specific logic circuits.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A method for evaluating vehicle service equipment utilization in a vehicle service operation including at least one automotive repair shop, comprising:
   inspecting for at least one vehicle service opportunity, a plurality of vehicles driving through a non-contact vehicle inspection system associated with said at least one automotive repair shop, said inspection identifying vehicles requiring a vehicle service corresponding to said at least one vehicle service opportunity;
   operating one or more vehicle service systems within said vehicle service operation to perform vehicle services on a subset of said plurality of vehicles;
   receiving vehicle service data from said vehicle service systems, said received vehicle service data identifying said vehicle services performed;
   generating, from said received vehicle service data a vehicle service report including a count of performed vehicle services corresponding to said at least one vehicle service opportunity;
   utilizing said identification of vehicles requiring said vehicle service, together with said count of performed vehicle services completed over a selected period of time to generate a report including at least one of:
      (i) a representation of said vehicle service opportunities missed;
      (ii) an efficiency representation based on said count of performed vehicle services expressed as a percentage of said count of vehicles requiring said vehicle service; or
      (iii) a progress representation expressed as a relationship between said vehicle service opportunities (required on said vehicles or completed by said vehicle service systems) and a target value; and
   responsive to said generated report, identifying underperforming elements within said vehicle service operation.

2. The method of claim 1 wherein said at least one vehicle service system is a wheel alignment system;
   wherein said at least one vehicle service opportunity is a vehicle wheel alignment adjustment; and
   wherein said step of generating a vehicle service report identifies a number of vehicle wheel alignment service procedures completed by at least one vehicle wheel alignment service system associated with said vehicle inspection system.

3. The method of claim 1 wherein said at least one vehicle service system is a point of sale system in said at least one automotive repair shop associated with said non-contact vehicle inspection system, said point of sale system configured to record sales of replacement tires;
   wherein said at least one vehicle service opportunity is an identification of at least one tire on a vehicle having a tire tread depth below a replacement threshold; and wherein said step of generating a vehicle service report identifies a number of tire replacement sales provided by said at least one automotive repair shop.

4. The method of claim 1 further including the step of generating an alert for a user if said count of performed vehicle services completed over said selected period of time fails to meet a threshold or alternatively, if said output exceeds said threshold.

5. A system for reporting utilization in a vehicle service operation including at least one vehicle service shop, comprising:
- at least one non-contact vehicle inspection system associated with said vehicle service shops operable to inspect a first plurality of vehicles within a period of time to identify vehicles requiring one or more vehicle services
- at least one vehicle service system associated with said vehicle service shops operable to perform vehicle services on said vehicles within said period of time;
- a cloud-based data management system, said cloud-based data management system including at least a processing system, a data storage system operatively coupled to said processing system, and a communication system operatively coupled to said processing system, said communication system further configured to receive vehicle inspection data automatically conveyed from said at least one non-contact vehicle inspection system and vehicle service data automatically conveyed from said at least one vehicle service system
- wherein said processing system is configured with software instructions to process said vehicle inspection data and vehicle service data received through said communication system for subsequent storage in said data storage system in association with an identifier for said at least one associated vehicle service shop;
- wherein said processing system is further configured with software instructions to evaluate said vehicle inspection data and said vehicle service data contained within in said data storage system, associated with said identifier for at least one selected vehicle service shop, to determine at least one utilization metric, said utilization metric being one of:
  (i) a number of vehicle service opportunities missed, wherein a total number of vehicle service opportunities for a period of time is determined from said vehicle inspection data, and wherein said number of vehicle service opportunities missed is determined by comparison of said total number with a count of associated vehicle service procedures shown as completed within said period by said vehicle service data;
  (ii) an efficiency representation expressed as a percentage of identified vehicles requiring a selected vehicle service shown by said vehicle inspection data for a period of time over a cumulative number of said first plurality of vehicles;
  (iii) a progress representation expressed as a relationship between vehicle service opportunities within a period of time (identified from said vehicle inspection data, or shown as completed within said vehicle service data) and a target value; and
- wherein said processing system is further configured with software instructions to automatically prepare a periodic report including said at least one determined service metric associated with said identifier for said at least one selected vehicle service shop, and to automatically convey said periodic report via said communications system to a receiving device for presentation to a viewer.

6. The system of claim 5 wherein said processing system is further configured with software instructions to respond to a user query by including at least one determined service metric associated with said identifier for said at least one selected vehicle service shop in a generated individual report.

7. The system of claim 5 wherein said service metric is said progress representation expressed as a relationship between said vehicle service opportunities (identified or completed) and said target value, and wherein said target value is selected by a user.

8. The system of claim 5 further including a display device associated with said at least one vehicle service shop, said display device operatively connected to said communication system; and
wherein said processing system is further configured with software instructions to automatically generate a vehicle summary report in response to receipt of said vehicle inspection data from said at least one associated non-contact vehicle inspection system, and to convey said vehicle summary report via said communications system to said display device for presentation to a viewer.

9. The system of claim 8 wherein said display device is configured to present a plurality of said generated vehicle summary reports simultaneously.

10. The system of claim 9 wherein said plurality of generated vehicle summary reports are organized chronologically for presentation on said display device.

11. The system of claim 5 wherein said receiving device is one of a lane activity display device, a shared dataspace, a data storage device, a mobile display device, or an e-mail account.

* * * * *